United States Patent [19]

Protze

[11] 4,156,408

[45] May 29, 1979

[54] RADIATOR ARRANGEMENT

[75] Inventor: Dieter Protze, Wolfsburg, Fed. Rep. of Germany

[73] Assignee: Volkswagenwerk Aktiengesellschaft, Wolfsburg, Fed. Rep. of Germany

[21] Appl. No.: 783,451

[22] Filed: Mar. 31, 1977

[30] Foreign Application Priority Data

Apr. 7, 1976 [DE] Fed. Rep. of Germany ....... 2614969

[51] Int. Cl.² .............................................. F01P 3/20
[52] U.S. Cl. ............................ 123/41.51; 123/41.09; 165/35; 165/40; 165/103; 165/175
[58] Field of Search ............... 123/41.51, 41.09, 41.08; 165/35, 40, 103, 175

[56] References Cited

U.S. PATENT DOCUMENTS

| | | | |
|---|---|---|---|
| 1,637,102 | 7/1927 | Coale | 123/41.51 |
| 2,086,360 | 7/1937 | Hill | 123/41.08 |
| 2,086,441 | 7/1937 | Rushmore | 123/41.51 |
| 2,500,472 | 3/1950 | Sohler | 123/41.51 |

FOREIGN PATENT DOCUMENTS

| | | | |
|---|---|---|---|
| 1022105 | 1/1958 | Fed. Rep. of Germany | 123/41.51 |
| 1027083 | 3/1958 | Fed. Rep. of Germany | 123/41.51 |
| 2435632 | 2/1975 | Fed. Rep. of Germany | 165/175 |

Primary Examiner—Charles J. Myhre
Assistant Examiner—Jeffrey L. Yates
Attorney, Agent, or Firm—Spencer & Kaye

[57] ABSTRACT

A motor vehicle equipped with a liquid-cooled internal combustion engine. A radiator is provided, the same having first and second regions which themselves have aligned edges that form an edge of the radiator. Conduits are provided for allowing the flow of coolant through the two regions of the radiator in opposite directions. A coolant chamber extends along the edge of the radiator, this coolant chamber being divided into first and second sub-chambers by a partition which extends transversely to the edge and which defines the demarcation between the first and second regions of the radiator. The first and second sub-chambers of the coolant chamber communicate with the first and second regions of the radiator, respectively. A thermostatic valve arrangement is provided which allows the flow of coolant from the first sub-chamber to the second sub-chamber, and hence through both the first and second radiator regions, only when the temperature of the coolant is above a predetermined temperature.

4 Claims, 3 Drawing Figures

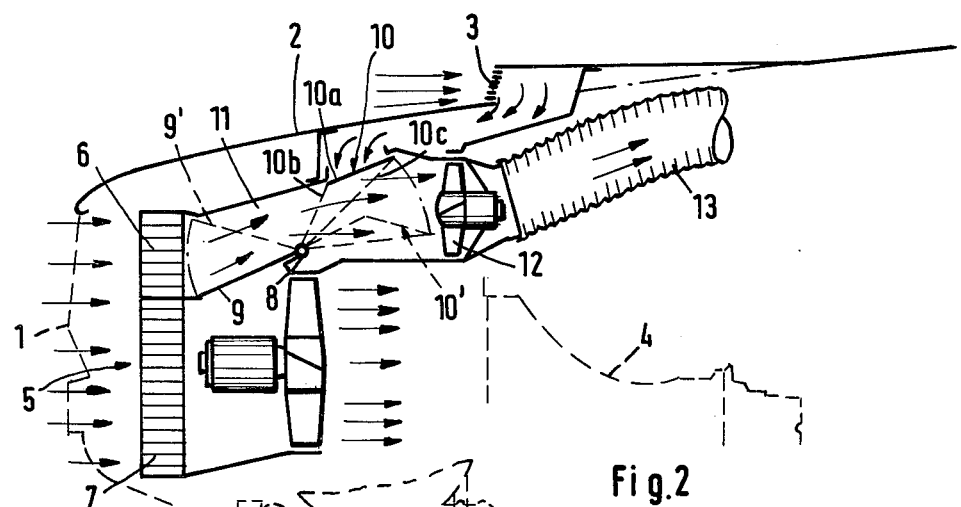
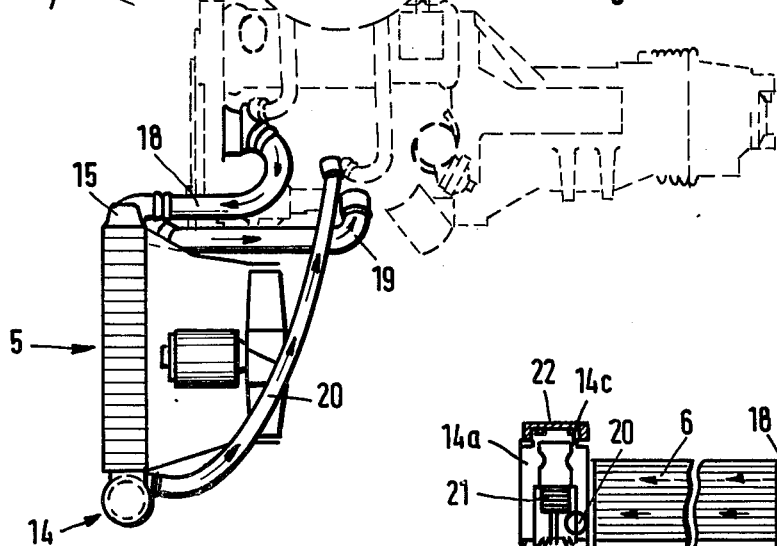
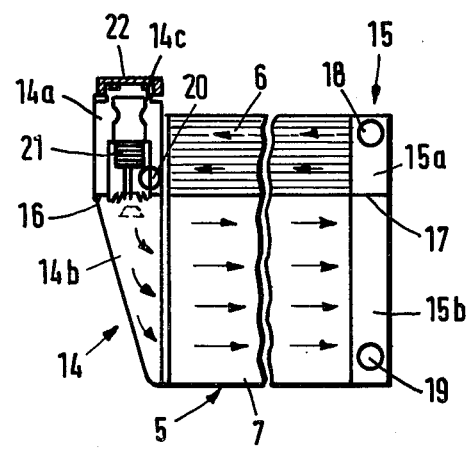

RADIATOR ARRANGEMENT

BACKGROUND OF THE INVENTION

The present invention relates to a motor vehicle which is equipped with a liquid-cooled internal combustion engine. The engine is cooled by a radiator through which there is a continuous flow of coolant, the radiator itself having first and second regions, the latter being serially connected, via a thermostatic valve, with the first region only when the coolant is above a predetermined temperature.

Arrangements of this type are shown, for example, in German Pat. No. 1,022,105 issued June 12, 1958 (first published Jan. 2, 1958) and German Pat. No. 1,027,083 issued Sept. 11, 1958 (first published Mar. 27, 1958), where the physical construction of the radiator is such that it is divided into two individual, separately identifiable components. Dividing the radiator into two separate components only one of which, namely, the one that is the first one upstream as considered in the direction of flow of the coolant, has the advantage that the internal combustion engine will have a relatively short warm-up time, because only a relatively small proportion of the total volume of the coolant in the system will be recirculated through the radiator. Only after the coolant has reached a predetermined temperature, which will be the temperature at which the thermostatic valve is set to respond, will there be flow of coolant through both the first and second radiator components, thus preventing overheating of the engine. In practice, the second radiator component, namely, the one which is not traversed by coolant during the warm-up time, will generally have a larger capacity than the first component.

Another advantage of providing two separate radiator components is achieved when, as is likewise described in the mentioned German patents, the first radiator component is used as part of the heat exchanger for the heater which serves to heat the interior of the motor vehicle. The reason for this is that in vehicles in which the entire radiator is used as the heat exchanger for the heater, it will take a relatively long time for the coolant to reach a temperature which will enable the heater to put out the amount of heat required to warm up the interior of the vehicle, because it takes a certain amount of time for the entire quantity of coolant to warm up. If, however, the radiator is divided into two components and only one of them is used as part of the heat exchanger, the amount of coolant flowing through it will be less than the total capacity of the cooling system and this, in turn, allows the reduced quantity of coolant to warm up more quickly. It will be appreciated that thanks to such an arrangement, the heat output of the heat exchanger, which is introduced into the interior of the vehicle either by a blower and/or by the ram air effect if the vehicle is moving, is available relatively quickly so that the interior of the vehicle can be heated up more rapidly than otherwise.

The above-described arrangement has the drawback in that it is relatively expensive to build and assemble a radiator having separate components, and it is, therefore, a basic object of the present invention to provide a radiator arrangement which, while taking advantage of the two-component concept, is structurally as uncomplicated as possible. Specifically, it is an object of the present invention to provide a way in which to utilize the two-component concept while making it unnecessary to provide two physically separate radiator components. Instead, the present invention provides a way in which to make use of a radiator which itself does not have any separate, interrupted tube systems, so that a major structural part of the radiator, which is the tubing system, can be mass-produced and can, in a manner of speaking, be cut to the desired length from a "band" of tubing.

BRIEF DESCRIPTION OF THE INVENTION

With the above object in view, the present invention resides in a radiator arrangement for use in a motor vehicle having a liquid-cooled internal combustion engine in which the tubing system of the radiator itself is not divided into separate structural entities, but rather, it is a single radiator which is divided into what may be thought of as two regions which have aligned edges which constitute an edge of the radiator. Conduit means are provided which communicate with the two regions of the radiator for allowing the flow of coolant therethrough in opposite directions. At least one coolant chamber extends along the edge of the radiator, there being a partition in the coolant chamber which extends transversely to the edge. The partition defines the demarcation between the two radiator regions and divides the coolant chamber into first and second sub-chambers which communicate with the two radiator regions, respectively. A thermostatic valve is provided for allowing the flow of coolant from the first sub-chamber to the second sub-chamber, and hence through both of the radiator regions, only when the temperature of the coolant is above a predetermined temperature. When the temperature is below this predetermined temperature, the coolant is recirculated by way of a separate outlet conduit which communicates with the sub-chamber which itself is in communication with the first of the two radiator regions, this separate outlet conduit thus serving as a bypass for the second of the two radiator regions.

BRIEF DESCRIPTION OF THE DRAWINGS

FIG. 1 is a longitudinal section of a motor vehicle which has its engine at the front and which is equipped with a radiator arrangement according to the present invention.

FIG. 2 is a plan view of the arrangement shown in FIG. 2.

FIG. 3 is a rear view of the radiator.

DETAILED DESCRIPTION OF THE PREFERRED EMBODIMENT

Referring now to the drawings, the same show the front end 1 of a motor vehicle having a hood 2 which is provided with a fresh air inlet 3, the engine itself being shown schematically at 4. The structural details of the vehicle per se are, for purposes of the present invention, not material and need therefore not be described in detail.

The radiator arrangement according to the present invention comprises an engine radiator 5 which itself is divided into two regions 6 and 7. The region 6 of the radiator serves as part of the heat exchanger for the vehicle heater and, as is apparent from FIG. 1, has connected behind it—reference being had with the direction of travel of the vehicle—a double flap which is hinged for pivotable movement about an axle 8. The double flap itself comprises the two flaps 9 and 10, the latter being provided with three portions 10a, 10b and 10c. Flap 9 and flap portion 10a are impervious to the flow of air while flap portions 10b and 10c are lateral struts holding flap portion 10a. When the double flap is in the position depicted in solid lines in FIG. 1, it forms a hot air channel 11 so that air which has been heated by the region 6 of the radiator will be forced by a blower 12 into a conduit 13 which itself leads to the interior (not shown) of the vehicle. When the double flap is in the position 9', 10', shown in phantom lines, a communication is established for allowing fresh air to flow from the inlet 3 into the conduit 13. This fresh air can be made to flow by means of the blower 12, or it can be the result of ram air pressure resulting from the forward motion of the vehicle. While the double flap is in the position 9', 10', warm air coming from the region 6 of the radiator will be deflected by the flap 9 and be vented to atmosphere.

The coolant which flows through the radiator regions 6, 7, will normally be a liquid such as water, admixed, if desired with anti-freeze and/or other additives which are conventionally used with automotive radiator coolants.

According to the prior art, as exemplified by the above-mentioned German Pat. No. 1,022,105, means are provided for letting the coolant circulating through the radiator flow only through the first radiator region 6 when the engine is first started, so that the coolant will heat up quickly, thus reducing the warm-up time of the engine and simultaneously bringing about a quick warm up of the heat exchanger of the vehicle heating system, of which the first radiator component is a part. These means are constituted, for example, by a thermostatic valve arrangement as well as by a bypass which short-circuits the second radiator region 7, as will be described below and as is per se conventional in the art, as exemplified by the above-mentioned German Pat. No. 1,022,105.

According to the present invention, however, it is unnecessary to divide the radiator into two physically separate components. That is to say, the radiator, which itself is constituted by a tubing arrangement over which cooling air is made to flow, need not be divided into structurally separate entities. This result is achieved by providing at least one but preferably two coolant chambers 14, 15, which extend along the edges of the regions 6, 7, these edges extending in the direction in which the two regions follow each other. This, in the illustrated embodiment, is the vertical direction. The two coolant chambers 14, 15, are subdivided by two aligned transverse walls 16, 17, which are arranged at a level which defines the division or demarcation between the two radiator regions 6, 7. The coolant chambers 14, 15, are thus divided into first and second—here upper and lower—sub-chambers 14a, 14b; 15a, 15b, respectively, as shown in FIG. 3. A common inlet conduit 18 communicates with the upper sub-chamber 15a, while the lower sub-chamber 15b communicates with an outlet conduit 19 which serves to lead away coolant which has flowed through the second radiator region 7.

The upper sub-chamber 14a communicates with a second outlet conduit 20 which serves as a return conduit to lead away that portion of the coolant which has flowed through only the first radiator region 6.

The coolant chamber 14 is equipped with a conventional thermostatic valve arrangement 21 which, during the warm-up phase of the engine, is closed, thus closing off the transverse wall 16. The operation of the thermostatic valve arrangement is conventional and need therefore not be described in detail, suffice it to say that the thermostatic valve will be in a closed position while the coolant is below a predetermined threshold temperature of, for example, approximately 85° C., and in an open position when the coolant is above this predetermined temperature. Consequently, when the coolant is below the predetermined temperature, only a relatively small portion of the total volume of the coolant is heated, and it is this portion which, when the thermostatic valve arrangement 21 is closed, is caused to flow through the conduit 20, the latter then serving as a bypass for the second radiator region 7. The thermostatic valve arrangement 21 will not assume its open position until the coolant reaches the predetermined temperature, whereupon at least the major portion of the coolant is free to flow through both of the radiator regions 6, 7, in opposite directions and through the outlet conduit 19.

As is likewise shown in FIG. 3, the upper end of the coolant chamber 14 is provided with an opening 14c which allows not only replacement of coolant if and when necessary, but likewise facilitates access to the place where the thermostatic valve arrangement 21 is located, thus allowing the latter to be inserted and removed as and when necessary. The opening 14c is closable by a closure cap 22.

The coolant chambers 14, 15, can be made of metallic sheet material or of plastic, and are physically attached to the radiator by means of a fluid-tight scarf joint or other type of suitable connection.

It will thus be seen that, in accordance with the present invention there is no coolant chamber which surrounds the entire tubing system of the radiator, rather, the means which form the coolant chamber are located at the edge of the radiator. The coolant chamber, being divided into two sub-chambers, is equipped with the thermostatic valve which remains closed until the predetermined threshold temperature is reached, and during this time the coolant which flows through the first of the two regions of the radiator is made to bypass the second region. Only when the coolant reaches the predetermined threshold temperature will the thermostatic valve 21 permit the flow of coolant to the other sub-chamber which itself is in communication with the second region of the radiator, whereupon at least the major portion of coolant will flow through the tubes of both the first and second regions of the radiator, the structural arrangement of the parts being such that the coolant will flow through the tubes of the two regions in opposite directions.

As described above, the illustrated embodiment includes two coolant chambers, arranged along the opposite edges of the radiator. In this embodiment, the coolant chamber 15, i.e., the one which does not contain the thermostatic valve arrangement 21, is provided with the common inlet and outlet conduits 18, 19.

As mentioned above, if the radiator is used in conjunction with the heater of the vehicle, using only the first region as part of the heat exchanger reduces the warm-up time of the coolant, thus allowing the interior of the vehicle to be heated up more quickly than if the entire radiator were part of the heat exchanger.

It will be understood that the above description of the present invention is susceptible to various modifications, changes and adaptations, and the same are intended to be comprehended within the meaning and range of equivalents of the appended claims.

What is claimed is:

1. In a motor vehicle equipped with a liquid-cooled internal combustion engine, the combination which comprises:
    (a) a one-piece radiator having first and second opposite edges and provided with means which allow coolant to flow through the radiator, from one edge to another, in each of two regions of the radiator;
    (b) means forming a first coolant chamber extending along said first edge of said radiator;
    (c) a first partition in said first coolant chamber and extending transversely to said first edge, said partition defining the demarcation between said first and second radiator regions and dividing said coolant chamber into first and second sub-chambers which communicate with said first and second regions of said radiator, respectively;
    (d) means forming a second coolant chamber extending along said second edge of said radiator;
    (e) a second partition in said second cooling chamber and extending transversely to said second edge and aligned with said first partition of said first coolant chamber, said second partition dividing said second coolant chamber into first and second sub-chambers which communicate with said first and second regions of said radiator, respectively;
    (f) an inlet conduit in communication with said first sub-chamber of said second coolant chamber;
    (g) a first outlet conduit in communication with said second sub-chamber of said second coolant chamber;
    (h) a second outlet conduit in communication with said first sub-chamber of said first coolant chamber; and
    (i) thermostatic valve means in said first coolant chamber for allowing the flow of coolant from said first sub-chamber thereof to said second sub-chamber thereof only when the temperature of said coolant is above a predetermined temperature, in consequence of which when the temperature of said coolant is above said predetermined temperature, coolant may flow from said inlet conduit through said first sub-chamber of said second coolant chamber, said first region of said radiator, said first sub-chamber of said first coolant chamber, said second sub-chamber of said first coolant chamber, said second region of said radiator and said second sub-chamber of said second coolant chamber and out of said first outlet, whereas when the temperature of said coolant is below said predetermined temperature, coolant may flow from said inlet conduit only through said first chamber of said second coolant chamber, said first region of said radiator and said first sub-chamber of said first coolant chamber and out of said second outlet conduit, said second region of said radiator thus being bypassed by way of said second outlet conduit.

2. The combination defined in claim 1, wherein said thermostatic valve means are arranged in said first partition and are movable between a closed position when the temperature of the coolant is below said predetermined temperature and an open position when the temperature of the coolant is above said predetermined temperature.

3. The combination defined in claim 1, wherein said coolant chamber is provided with a closable opening for allowing access to said thermostatic valve means.

4. In a motor vehicle equipped with a liquid-cooled internal combustion engine and a heater for heating the interior of the vehicle, the combination defined in claim 1 wherein said first radiator region is part of a heat exchanger for said heater.

* * * * *